United States Patent [19]

Deschaine et al.

[11] Patent Number: 5,809,029
[45] Date of Patent: Sep. 15, 1998

[54] APPARATUS AND METHOD FOR MAPPING TELECOMMUNICATIONS SIGNALS ONTO A SUBSCRIBER BUS

[75] Inventors: Stephen A. Deschaine, Garland; Manouchehr Entezari, Flower Mound; Rudolph B. Klecka, III, Dallas, all of Tex.

[73] Assignee: DSC Telecom L.P., Plano, Tex.

[21] Appl. No.: 767,689

[22] Filed: Dec. 17, 1996

Related U.S. Application Data

[60] Provisional application No. 60/020,762, Jun. 28, 1996.
[51] Int. Cl.[6] .................................................. H04J 3/16
[52] U.S. Cl. ......................... 370/467; 370/498; 370/522
[58] Field of Search .................................. 370/465–467, 370/476, 498, 522

[56] References Cited

U.S. PATENT DOCUMENTS 5,077,735 12/1991 Myung et al. ......................... 370/467
5,557,614 9/1996 Sandler et al. ........................ 370/509

FOREIGN PATENT DOCUMENTS 2061673 5/1981 United Kingdom ............ H04L 13/08
2151437 7/1985 United Kingdom .............. H04J 3/06

OTHER PUBLICATIONS

PCT Search Report, dated Nov. 3, 1997, for PCT/US97/11291.

*Primary Examiner*—Melvin Marcelo
*Attorney, Agent, or Firm*—Baker & Botts, L.L.P.

[57] ABSTRACT

In a subscriber loop equipment (10) having a subscriber bus (26), there is provided an odd data stream carrying a first set of data time slots of an E1 signal and a first set of signaling and control time slots of the E1 signal, and an even data stream carrying a second set of data time slots of the E1 signal and a second set of signaling and control time slots of the E1 signal. The odd and even data streams are bit-interleaved and transported on the subscriber bus (26).

31 Claims, 3 Drawing Sheets

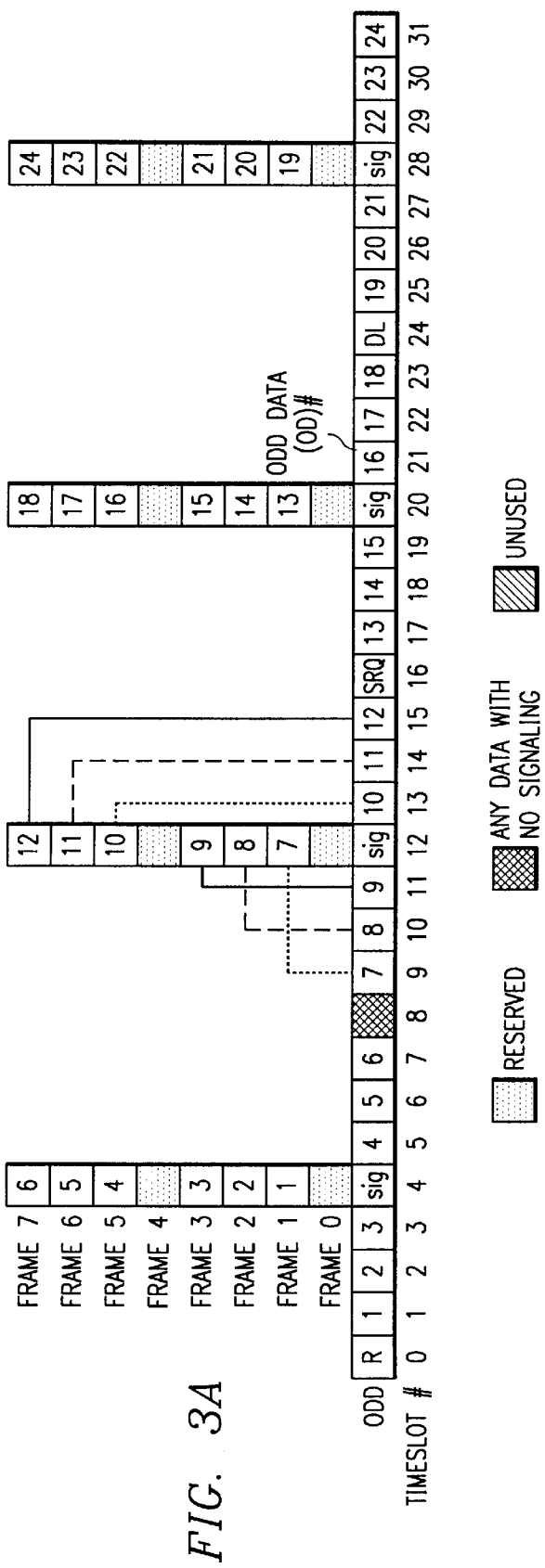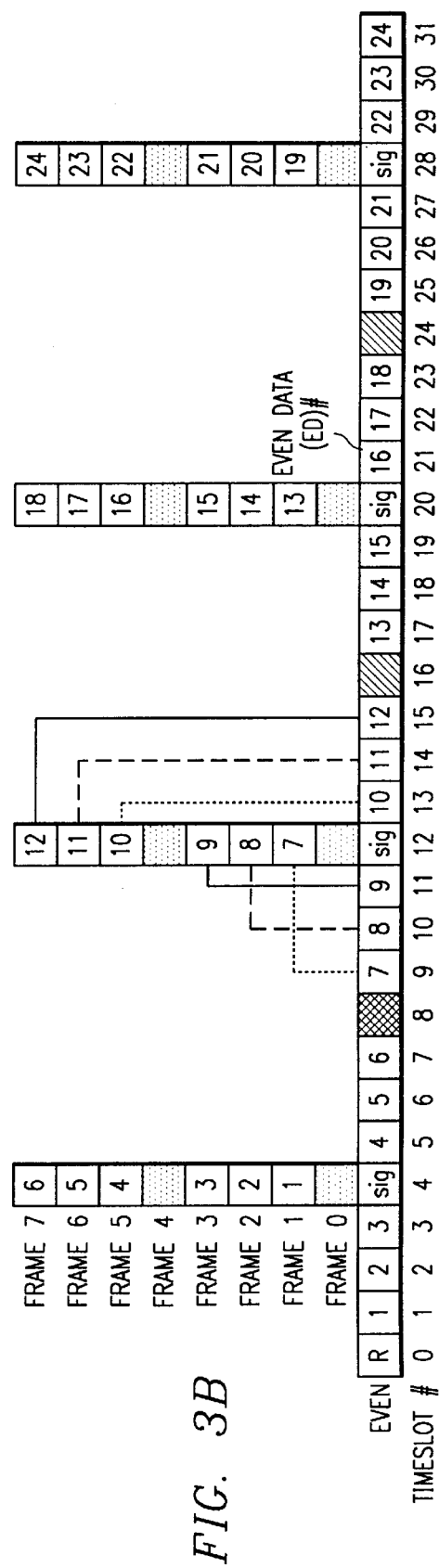

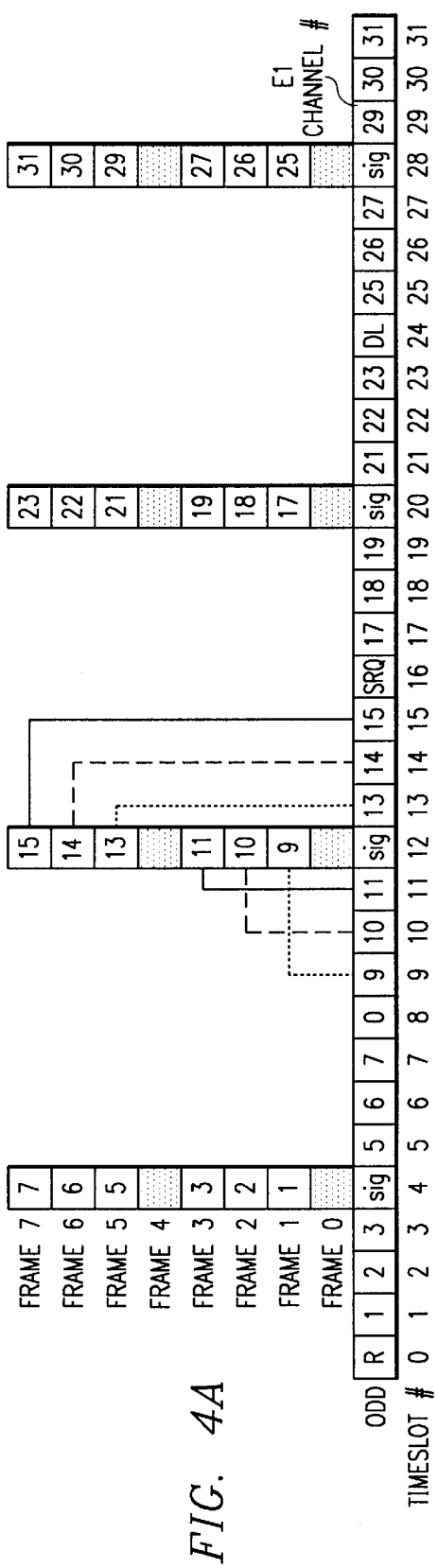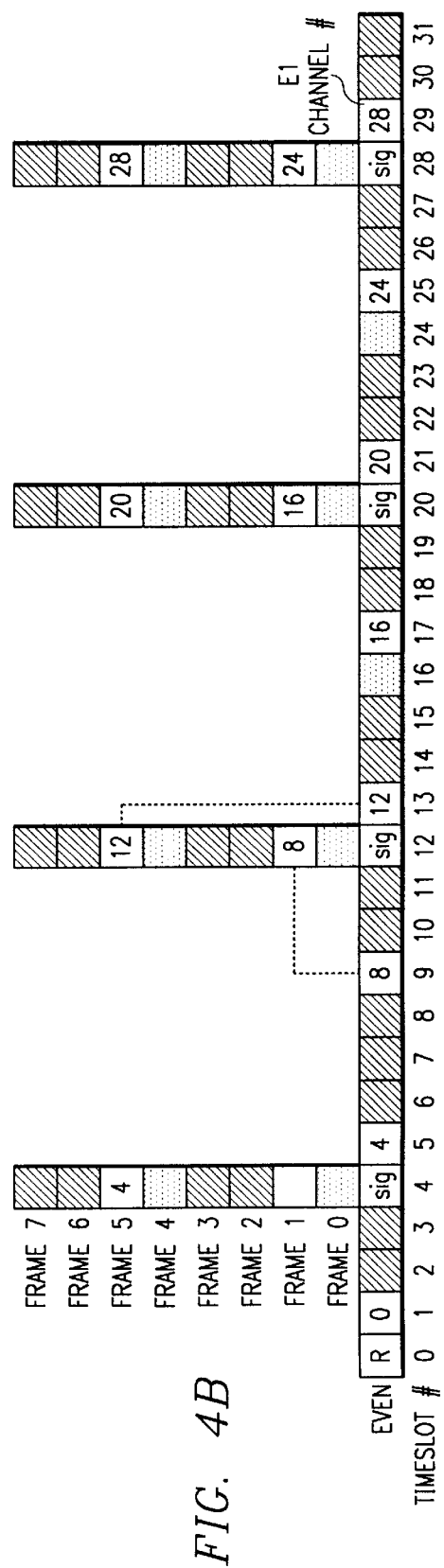

APPARATUS AND METHOD FOR MAPPING TELECOMMUNICATIONS SIGNALS ONTO A SUBSCRIBER BUS

RELATED APPLICATIONS

This application claims the benefit of U.S. Provisional Application No. 60/020,762, entitled Apparatus and Method for Mapping Telecommunications Signals onto a Subscriber Bus, filed on Jun 28, 1996. This application is related to U.S. patent application Ser. No. 08/768,316, entitled Apparatus and Method for Mapping Telecommunications Signals onto a Subscriber Bus, filed Dec. 17, 1996, of the same assignee, attorney docket number 36560-5660.

TECHNICAL FIELD OF THE INVENTION

This invention is related in general to the field of telecommunications systems. More particularly, the invention is related to apparatus and method for mapping telecommunications signals onto a subscriber bus.

BACKGROUND OF THE INVENTION

In the early days of telecommunication, a copper wire medium was used to carry a single information channel. Because the greatest proportion of cost is in the materials and construction of the physical link, telephony engineers have developed ways to pack multiple channels onto a single physical link. Frequency division multiplexing (FDM) and time division multiplexing (TDM) have been devised to multiplex multiple streams of analog and pulse code modulation (PCM) digital signals, respectively, into one. For digital signals, the time division multiplexing hierarchy is DS0 through DS4, where a DS0 is a single 0.064 Mbps channel, a DS1 is 24 DS0s multiplexed together, and a DS4 is 4,032 DS0s multiplexed together.

A similar time division multiplexing scheme is used in international telephone systems based on 32-channel format, where each channel is occupied by a DS0 signal. The international digital systems, based on International Telecommunication Union CCITT's G.700 Series Recommendations, are commonly called E1 or CEPT-1. The E1 signals are based on blocks of 32 channels or time slots, of which time slot 0 and time slot 16 are typically used for control and signaling, respectively.

American telecommunications equipment manufacturers desiring to compete in the international arena must design and produce equipment that operate under the international standard. Alternatively, in order to achieve compatibility, telecommunications equipment which were originally designed and manufactured to handle signals under the American standards must be modified to accommodate international signals.

SUMMARY OF THE INVENTION

Accordingly, there is a need to provide subscriber loop equipment that are compatible with international standards, such as the transport of the E1 signal.

In one aspect of the invention, in a channel bank having a subscriber bus having a thirty-two time slot frame, there is provided an odd data stream carrying a first set of data time slots of an E1 signal and a first set of signaling and control time slots of the E1 signal, and an even data stream carrying a second set of data time slots of the E1 signal and a second set of signaling and control time slots of the E1 signal. The odd and even data streams are bit-interleaved and transported on the subscriber bus.

In another aspect of the invention, a method for mapping E1 signals onto a subscriber bus includes the steps of mapping a first set of data channels of the E1 signals onto predetermined time slots of an odd data stream, and mapping a first set of signaling and control channels of the E1 signals onto other predetermined time slots of the odd data stream. Further included are the steps of mapping a second set of data channels of the E1 signals onto predetermined time slots of an even data stream, and mapping a second set of signaling and control channels of the E1 signals onto other predetermined time slots of the even data stream. Then the odd and even data streams are bit-interleaved for transport on the subscriber bus.

BRIEF DESCRIPTION OF THE DRAWINGS

For a better understanding of the present invention, reference may be made to the accompanying drawings, in which:

FIGS. 3A and 3B are exemplary mapping diagrams for the subscriber bus; and

FIGS. 4A and 4B are further exemplary mapping diagrams for the subscriber bus.

DETAILED DESCRIPTION OF THE INVENTION

Figure 2:
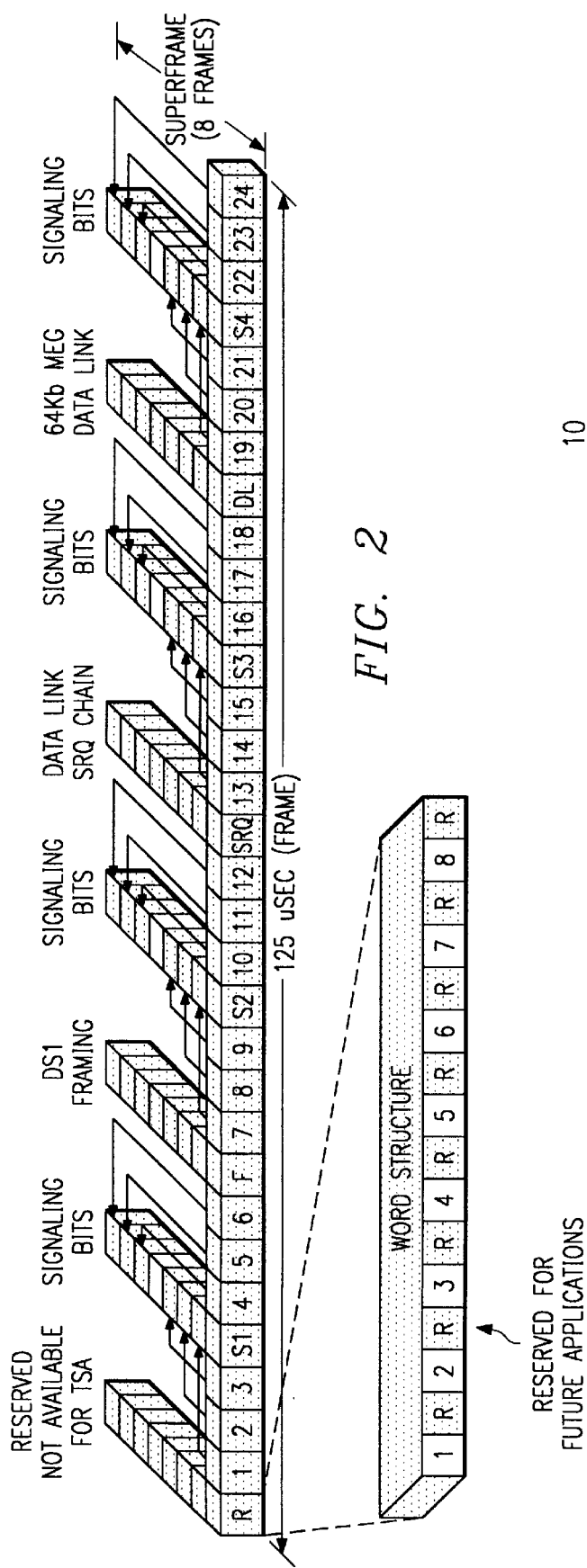
FIG. 2 is a diagram of an embodiment of a subscriber bus structure according to the teachings of the present invention.

The preferred embodiment(s) of the present invention is (are) illustrated in FIGS. 1–4, like reference numerals being used to refer to like and corresponding parts of the various drawings.

Figure 1:
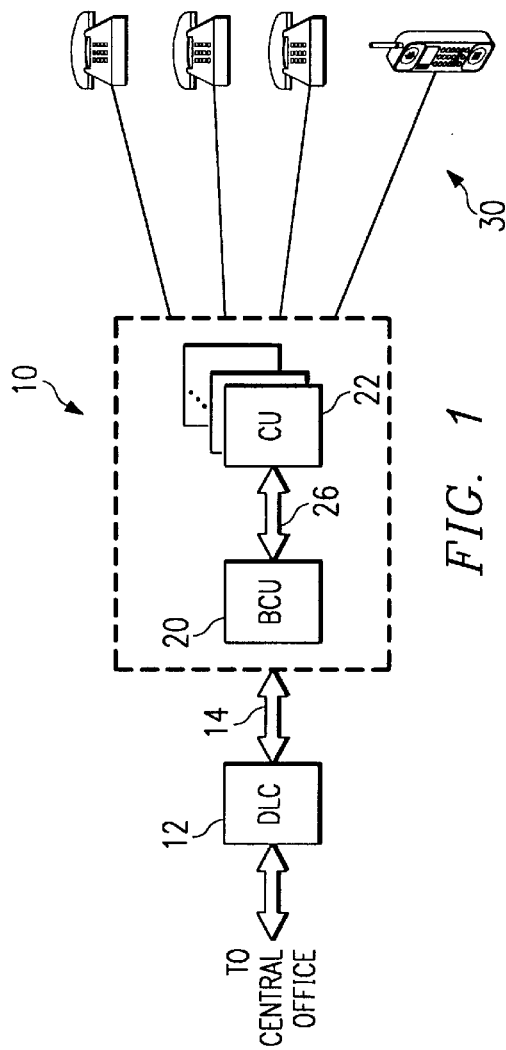
FIG. 1 is a top level block diagram of an exemplary channel bank unit constructed according to the teachings of the present invention.

Referring to FIG. 1, a channel bank 10 constructed according to the teachings of the present invention is shown. Channel bank 10 is coupled to a digital loop carrier 12 through a data and control message link 14. Digital loop carrier 12 is in communications with equipment residing in a central office (not shown), such as a central office terminal (not shown) of the digital loop carrier and a digital cross-connect system (not shown).

Channel bank 10 is a DS0 to DS1 or DS0 to E1 multiplexing equipment primarily used for analog voice to pulse code modulation (PCM) conversion and multiplexing. Channel bank 10 includes a bank control unit (BCU) 20, which may be coupled to more than one channel unit (CU) 22 via a subscriber bus 26. Channel units 22 may operate at DS1 and DS3 rates, as well as international rates such as E1. A plurality of subscriber equipment 30 may be coupled to each channel unit 22.

The data carried on subscriber bus 26 has the exemplary format shown in FIG. 2. Each frame includes 32 time slots or channels, eight of which are reserved or devoted to signaling and control. In FIG. 2, "R" denotes a reserved slot; "S1" through "S4" denote signaling time slots; "F" denotes framing; "SR" denotes systems communications service request channel; and "DL" denotes data link. In the signaling time slots of each frame, the arrows indicate the signaling time slots for the channels. The word structure for each time slot is also shown.

Subscriber bus 26 is comprised of two bit-interleaved data streams. FIGS. 3A and 3B show the data and signaling format for the ODD and EVEN data streams, which may be identical to transport two DS1 signals. Note that "sig"

denotes signaling time slots. The dual DS1 or T1 mapping scheme is described in copending U.S. Patent Application titled Apparatus and Method for Mapping Telecommunications Signals onto a Subscriber Bus, Ser. No. 08/768,316, filed on Dec. 17, 1996.

To accommodate E1 signals, both data streams are need to transport the data and signaling of one E1 signal, since it is comprised of 32 data time slots. The exemplary format for transporting the E1 signal by the ODD and EVEN data streams is shown in FIGS. 4A and 4B. It may be seen that the channels are split between the two data streams. In the embodiment shown in FIGS. 4A and 4B, 24 channels are carried on the ODD data stream, and the remaining eight channels are carried on the EVEN data stream. It may be seen that the exact mapping of the E1 channels onto the data streams may differ than shown. Further, it is contemplated that more than two data streams may be multiplexed together to form subscriber bus 26.

Although the present invention and its advantages have been described in detail, it should be understood that various changes, substitutions and alterations can be made therein without departing from the spirit and scope of the invention as defined by the appended claims.

What is claimed is:

1. In a channel bank having a subscriber bus having a thirty-two time slot frame, comprising:

an odd data stream carrying a first set of data time slots of an E1 signal and a first set of signaling and control time slots of the E1 signal;

an even data stream carrying a second set of data time slots of the E1 signal and a second set of signaling and control time slots of the E1 signal; and the odd and even data streams being bit-interleaved and transported on the subscriber bus.

2. The channel bank, as set forth in claim 1, wherein the odd data stream comprises data time slots 1–3, 5–7, 9–11, 13–15, 17–19, 21–23, 25–27, and 29–31.

3. The channel bank, as set forth in claim 1, wherein time slots 1–3, 5–7, 9–11, 13–15, 17–19, 21–23, 25–27, and 29–31 of the odd data stream comprises data time slots 1–3, 5–7, 9–11, 13–15, 17–19, 21–23, 25–27, and 29–31, respectively.

4. The channel bank, as set forth in claim 1, wherein the even data stream comprises data time slots 0, 4, 8, 12, 16, 20, 24, and 28.

5. The channel bank, as set forth in claim 1, wherein time slots 1, 5, 9, 13, 17, 21, 25, and 29 of the even data stream comprises data time slots 0, 4, 8, 12, 16, 20, 24, and 28, respectively.

6. The channel bank, as set forth in claim 1, wherein the odd data stream comprises signaling and control time slots SRQ and DL.

7. The channel bank, as set forth in claim 1, wherein time slots 16 and 24 of the odd data stream comprises signaling and control time slots SRQ and DL, respectively.

8. The channel bank, as set forth in claim 1, wherein the odd data stream comprises signaling time slots S1–S4.

9. The channel bank, as set forth in claim 1, wherein time slots 4, 12, 20, and 28 of the odd data stream comprises signaling time slots S1–S4, respectively.

10. The channel bank, as set forth in claim 1, wherein the even data stream comprises signaling time slots S1–S4.

11. The channel bank, as set forth in claim 1, wherein time slots 4, 12, 20, and 28 of the even data stream comprises signaling time slots S1–S4, respectively.

12. A subscriber loop equipment having a bus, comprising:

an odd data stream carrying data time slots 1–3, 5–7, 9–11, 13–15, 17–19, 21–23, 25–27, and 29–31 of an E1 signal and a first set of signaling and control time slots of the E1 signal;

an even data stream carrying data time slots 0, 4, 8, 12, 16, 20, 24, and 28 of the E1 signal and a second set of signaling and control time slots of the E1 signal; and the odd and even data streams being bit-interleaved and transported on the bus.

13. The subscriber loop equipment, as set forth in claim 12, wherein time slots 1–3, 5–7, 9–11, 13–15, 17–19, 21–23, 25–27, and 29–31 of the odd data stream comprises data time slots 1–3, 5–7, 9–11, 13–15, 17–19, 21–23, 25–27, and 29–31, respectively.

14. The subscriber loop equipment, as set forth in claim 12, wherein time slots 1, 5, 9, 13, 17, 21, 25, and 29 of the even data stream comprises data time slots 0, 4, 8, 12, 16, 20, 24, and 28, respectively.

15. The subscriber loop equipment, as set forth in claim 12, wherein the odd data stream comprises signaling and control time slots SRQ and DL.

16. The subscriber loop equipment, as set forth in claim 12, wherein time slots 16 and 24 of the odd data stream comprises signaling and control time slots SRQ and DL, respectively.

17. The subscriber loop equipment, as set forth in claim 12, wherein the odd data stream comprises signaling time slots S1–S4.

18. The subscriber loop equipment, as set forth in claim 12, wherein time slots 4, 12, 20, and 28 of the odd data stream comprises signaling time slots S1–S4, respectively.

19. The subscriber loop equipment, as set forth in claim 12, wherein the even data stream comprises signaling time slots S1–S4.

20. The subscriber loop equipment, as set forth in claim 12, wherein time slots 4, 12, 20, and 28 of the even data stream comprises signaling time slots S1–S4, respectively.

21. A method for mapping E1 signals onto a subscriber bus having thirty-two time slot frames, comprising the steps of:

mapping a first set of data channels of the E1 signals onto predetermined time slots of an odd data stream;

mapping a first set of signaling and control channels of the E1 signals onto other predetermined time slots of the odd data stream;

mapping a second set of data channels of the E1 signals onto predetermined time slots of an even data stream;

mapping a second set of signaling and control channels of the E1 signals onto other predetermined time slots of the even data stream; and bit interleaving the odd and even data streams.

22. The method, as set forth in claim 21, wherein the first set of E1 data channels mapping step comprises the step of mapping data channels 1–3, 5–7, 9–11, 13–15, 17–19, 21–23, 25–27, and 29–31 onto the predetermined time slots of the odd data stream.

23. The method, as set forth in claim 21, wherein the first set of E1 data channels mapping step comprises the step of mapping data channels 1–3, 5–7, 9–11, 13–15, 17–19, 21–23, 25–27, and 29–31 onto time slots 1–3, 5–7, 9–11, 13–15, 17–19, 21–23, 25–27, and 29–31, respectively, of the odd data stream.

24. The method, as set forth in claim 21, wherein the second set of E1 data channels mapping step comprises the step of mapping data channels 0, 4, 8, 12, 16, 20, 24, and 28 onto the predetermined time slots of the even data stream.

25. The method, as set forth in claim 21, wherein the second set of E1 data channels mapping step comprises the step of mapping data channels 0, 4, 8, 12, 16, 20, 24, and 28 onto time slots 1, 5, 9, 13, 17, 21, 25, and 29, respectively, of the even data stream.

26. The method, as set forth in claim 21, wherein the first set of signaling and control channel mapping step comprises the step of mapping an SRQ and a DL signaling channels onto the other predetermined time slots of the odd data stream.

27. The method, as set forth in claim 21, wherein the first set of signaling and control channel mapping step comprises the step of mapping an SRQ and a DL signaling channels onto time slots 16 and 24 of the odd data stream.

28. The method, as set forth in claim 21, wherein the first set of signaling and control channel mapping step comprises the step of mapping S1–S4 signaling channels onto the other predetermined time slots of the odd data stream.

29. The method, as set forth in claim 21, wherein the first set of signaling and control channel mapping step comprises the step of mapping S1–S4 signaling channels onto time slots 4, 12, 20, and 28, respectively, of the odd data stream.

30. The method, as set forth in claim 21, wherein the second set of signaling and control channel mapping step comprises the step of mapping S1–S4 signaling channels onto the other predetermined time slots of the even data stream.

31. The method, as set forth in claim 21, wherein the second set of signaling and control channel mapping step comprises the step of mapping S1–S4 signaling channels onto time slots 4, 12, 20, and 28, respectively, of the even data stream.

\* \* \* \* \*